(12) United States Patent
Grad et al.

(10) Patent No.: US 10,252,208 B2
(45) Date of Patent: Apr. 9, 2019

(54) FILTER ELEMENT WITH FILTER BELLOWS

(71) Applicant: MANN+HUMMEL GMBH, Ludwigsburg (DE)

(72) Inventors: Johannes Grad, Simbach (DE); Margarete Drexler, Dingolfing (DE); Kathrin Lichtenwalter, Nuremberg (DE); Helmut Brenneis, Marklkofen (DE); Anton Kreiner, Reisbach (DE); Marius Panzer, Stuttgart (DE); Florentin van Uffelen, Ludwigsburg (DE); Andreas Franz, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 10 days.

(21) Appl. No.: 15/172,278

(22) Filed: Jun. 3, 2016

(65) Prior Publication Data

US 2017/0001138 A1 Jan. 5, 2017

Related U.S. Application Data

(63) Continuation of application No. PCT/EP2014/076499, filed on Dec. 4, 2014.

(30) Foreign Application Priority Data

Dec. 5, 2013 (DE) ........................ 10 2013 018 165

(51) Int. Cl.
*B31D 5/00* (2017.01)
*B01D 29/11* (2006.01)
(Continued)

(52) U.S. Cl.
CPC .......... *B01D 46/523* (2013.01); *B01D 29/111* (2013.01); *B01D 29/333* (2013.01);
(Continued)

(58) Field of Classification Search
None
See application file for complete search history.

(56) References Cited

U.S. PATENT DOCUMENTS 3,165,473 A * 1/1965 Pall ....................... B01D 29/111
210/487
3,871,851 A * 3/1975 Neumann .............. B01D 46/10
55/500
(Continued)

FOREIGN PATENT DOCUMENTS

CA 2312825 A1 10/1999

*Primary Examiner* — Duane Smith
*Assistant Examiner* — Brit E. Anbacht
(74) *Attorney, Agent, or Firm* — James Hasselbeck (57) ABSTRACT

A filter element for filtering a fluid is provided with a filter bellows made of a filter medium folded along fold edges in a zigzag shape to form folds, wherein the folds extend between oppositely positioned end face edges of the filter bellows. The filter bellows defines a raw side and a clean side of the filter element, wherein a fluid to be filtered flows from the raw side to the clean side. The filter medium has faces that are flowed through by the fluid to be filtered. The filter medium is provided at least on one of the faces that are flowed through with beads extending transversely to the fold edges. In a proper operating state of the filter bellows, the beads effect a flow of at least a portion of the fluid to be filtered in a direction perpendicular to the fold edges.

7 Claims, 4 Drawing Sheets

(51) Int. Cl.
  *B01D 29/33* (2006.01)
  *B01D 46/00* (2006.01)
  *B01D 46/24* (2006.01)
  *B01D 46/52* (2006.01)

(52) U.S. Cl.
  CPC ...... *B01D 46/0001* (2013.01); *B01D 46/2411* (2013.01); *B01D 46/522* (2013.01); *B31D 5/0082* (2013.01); *B01D 2201/127* (2013.01); *B01D 2265/04* (2013.01); *B01D 2279/60* (2013.01)

(56) References Cited

U.S. PATENT DOCUMENTS

| | | | |
|---|---|---|---|
| 5,071,555 A * | 12/1991 | Enbom | B01D 46/10 210/493.5 |
| 5,089,202 A * | 2/1992 | Lippold | B01D 29/012 264/145 |
| 5,236,480 A * | 8/1993 | Svensson | B01D 46/10 55/385.2 |
| 5,252,207 A | 10/1993 | Miller et al. | |
| 5,306,321 A * | 4/1994 | Osendorf | B01D 39/1623 210/493.1 |
| 6,027,553 A * | 2/2000 | Hirano | B01D 46/006 55/385.2 |
| 6,165,241 A * | 12/2000 | Choi | B01D 29/012 55/521 |
| 6,165,242 A * | 12/2000 | Choi | B01D 29/012 55/524 |
| 7,097,684 B2 * | 8/2006 | Choi | B01D 29/012 55/486 |
| 7,323,105 B1 * | 1/2008 | Janikowski | B01D 46/523 210/493.1 |
| 7,425,227 B1 * | 9/2008 | Hutchison | B01D 46/10 55/385.3 |
| 7,625,418 B1 * | 12/2009 | Choi | B01D 29/012 55/521 |
| 9,242,201 B2 * | 1/2016 | Bao | B01D 39/16 |
| 9,486,719 B2 * | 11/2016 | Walz | B01D 46/523 |
| 9,919,256 B2 * | 3/2018 | Mbadinga-Mouanda | B01D 46/523 |
| 2006/0005518 A1 | 1/2006 | Duffey | |
| 2014/0202123 A1 | 7/2014 | Walz et al. | |

* cited by examiner

FILTER ELEMENT WITH FILTER BELLOWS

CROSS-REFERENCE TO RELATED APPLICATIONS

This application is a continuation application of international application No. PCT/EP2014/076499 having an international filing date of 4 Dec. 2014 and designating the United States, the international application claiming a priority date of 5 Dec. 2013, based on prior filed German patent application No. 10 2013 018 165.8, the entire contents of the aforesaid international application and the aforesaid German patent application being incorporated herein by reference.

BACKGROUND OF THE INVENTION

The invention concerns a filter element for filtering a fluid, comprising a filter bellows of a filter medium folded in a zigzag shape, in particular for use as a round filter of an internal combustion engine, in particular of a motor vehicle, as well as a method and an apparatus for manufacturing such a filter element.

End face folds are the two outer folds on opposite end faces of the filter bellows of a filter element. End face borders are the two free borders of the filter medium of which the filter bellows is formed which extend along the end face folds and delimit them at the end faces of the filter bellows. End face edges of the filter bellows are the two other free borders of the filter bellows which extend between the end face borders and extend in accordance with the folding of the filter bellows. The fold edges are the edges along which the filter medium is folded. In case of an approximately parallelepipedal filter bellows that is commercially known and folded in a zigzag shape, the end face borders and the fold edges generally are straight and extend parallel to each other. Viewing the filter bellows from the side, the end face edges extend in a zigzag shape and perpendicular to the end face borders and the fold edges. Prior to folding the filter medium, the end face edges of the future filter bellows, having an imaginary envelope of a substantially parallelepipedal shape, extend straight and parallel to each other. The imaginary envelope is defined by the end face edges, the neighboring fold edges or end face borders at a clean fluid side of the filter bellows, and the neighboring fold edges or end face borders at a raw fluid side.

In filter bellows of flat filter elements, the filter media are not closed, i.e., the end face folds, like the end face edges, are not connected to each other. In contrast thereto, in filter bellows of round filter elements the filter media are closed, i.e., their end face folds are connected to each other. Filter bellows of flat filter elements can be planar but can also have bends in different directions.

In filter systems in which repeated or cyclic fluctuations of the flow rate of the fluid to be filtered through the filter occur, failure of the filter due to fatigue can present a problem. This occurs in particular in systems with great flow rate changes, i.e., from zero to full flow rate and back to zero, as occurs, for example, in filter systems for piston pumps as they are used in energy facilities. These flow cycles cause corresponding cycles in the differential pressures in the filter which typically result in a breathing bending action of the folded medium of the filter. When the folded medium is comprised of a filter layer and a support and drainage layer, the support and drainage layer can rub back and forth against the filter layer upon bending of the folded medium. Since the support and drainage layer is typically more rough than the filter layer, this rubbing action can cause weak points which may rupture in operation. This type of failure is known as fatigue failure.

EP 0 470 485 A2 discloses a filter system that comprises a folded filter element with longitudinally extending folds with round peaks and a wrap member that is spirally wound about the filter element and is contacting the round peaks of the folds and is provided with openings for enlarging the dirt capacity of the filter element, wherein the total surface area of the openings is smaller than approximately half of the entire surface area that is defined by the round peaks of the folds. Moreover, the filter element comprises a folded composite with a first and a second extruded polymeric mesh and a filter layer which is arranged between them.

SUMMARY OF THE INVENTION

It is therefore an object of the invention to provide a filter element for filtration of a fluid that provides a stabilization and drainage possibility in the filter medium in a way that is beneficial with regard to manufacture and costs.

It is a further object to provide a method as well as an apparatus for manufacturing a filter element that provides a stabilization and drainage possibility in the filter medium in a way that is beneficial with regard to manufacture and costs.

The aforementioned object is solved according to one aspect of the invention by a filter element with a filter medium that comprises one or several beads which extend transversely to fold edges of the filter medium and which, in proper state of the filter bellows, effect flow of the fluid in a direction perpendicular to the fold edges of the filter bellows.

The further object is solved by a method as well as an apparatus for manufacturing such a filter element with a filter medium that comprises one or several beads which extend transverse to fold edges of the filter medium and which in the proper state of the filter bellows effect flow of the fluid in a direction perpendicular to the fold edges of the filter bellows.

Beneficial embodiments and advantages of the invention result from the further claims, the description, and the drawing.

A filter element for filtering a fluid in particular of an internal combustion engine, in particular of a motor vehicle, is proposed that comprises a filter bellows of a filter medium which, along fold edges, is folded in a zigzag shape to folds that extend between opposite end face edges of the filter bellows, respectively, and the filter medium is provided to be flowed through by the fluid from a raw side of the filter element to a clean side. In this context, the filter medium comprises at least at one of its flowed-through faces one or several beads which extend transversely to the fold edges of the filter medium and which, in the proper operating state of the filter bellows, effect a flow of at least a portion of the fluid in a direction perpendicular to the fold edges of the folds of the filter bellows.

The zigzag-folded folds can be formed with sharp edges or with rounded edges.

The advantage of the solution according to the invention resides in that, in contrast to conventional embodiments of filter elements in which usually a mesh is laminated onto the filter medium on the clean side for stabilization and drainage purposes, glue or plastic beads instead of the mesh are applied in the form of beads prior to or after embossment of the filter medium. These beads can be applied continuously or in intervals lengthwise relative to the processing direction of the filter medium and, prior to erecting the folds of the filter medium, have cured completely or at least mostly and ensure drainage as well as ensure a stabilizing action of the filter medium. The mesh and the lamination process can thus be eliminated. The beads can be in particular glue or plastic beads. The glue or plastic beads can be applied during the bellows production. The solution according to the invention thus provides significant time and cost savings relative to the conventional lamination process.

For the inventive application of the glue or plastic beads, the folds of the filter bellows can be embodied with rounded as well as with pointed fold edges.

The drainage effect of the beads resides in a deflection of at least a portion of the filtered fluid along the beads out of the folds of the filter bellows into the interior of the filter element so that the fluid cannot get backed up in the folds and thereby restrict the flow of the fluid. Also, deposition of possible dirt particles can be distributed across the surface of the filter medium.

Advantageously, the beads in the folded state of the filter medium, at least in the operating state, can cause the oppositely positioned fold edge surfaces of a fold of the filter bellows to be spaced apart. In this context, depending on the height of the beads in the non-flowed through and/or new state of the filter element, the beads for all intents and purposes can have a certain spacing. However, if during the course of operation of the filter element the filter bellows ages and relaxes or softens because of liquid, the beads can prevent that oppositely positioned fold edge surfaces of a fold of the filter bellows will contact each other or even stick to each other because the oppositely positioned beads are meeting at the same level, impact on each other, and in this way provide a spacing between the fold edge surfaces.

Preferably, the beads can extend perpendicularly to the fold edges. Alternatively, the beads or at least some of the beads can also extend in a wavy shape and/or zigzag shape. Due to this course, it is ensured that beads which are positioned opposite each other in the fold pocket will reliably contact each other at least at certain points while perpendicularly extending beads, due to a minimal transverse displacement or by gliding past each other, are maybe positioned adjacent to each other.

In order to provide a satisfactory drainage effect as well as a satisfactory stabilization of the filter medium and distance between oppositely positioned fold edge surfaces by means of the beads, it is expedient to provide a spacing between the parallel extending beads in a range of magnitude of, for example, 5-7 mm. This value is however dependent on the stiffness of the filter medium and on the fluid to be filtered as well as on the material of the bead. A height of the bead of, for example, 0.1 mm-3 mm is advantageous. This value is also dependent on the boundary conditions of the filter medium, of the fluid, and of the material.

A differential pressure (for example, 2.5 bar) existing at the filter element, which is caused in particular by the pressure loss due to the flow through the filter medium, can cause the fold interstices in the flow areas to collapse locally or even across the entire width of the filter medium, i.e., oppositely positioned filter medium sections at the clean side will come into direct contact. As a result of material irregularities, in particular with regard to non-uniform impregnation, stress and deformation may however occur also and can lead to a collapse at the raw side. Such collapsed areas are no longer flowed through so that the filtration performance of the filter element is restricted. Such a collapse of areas of the filter bellows can be prevented by application of beads according to the invention onto the filter medium because the beads cause the fold edge surfaces to be spaced apart, on the one hand, and, on the other hand, represent a reinforcement of the filter medium. Reinforcement of the filter medium wherein one or more beads are each spaced apart from each other and spaced apart from adjacent unfolded filter medium sections.

In a favorable configuration, the beads can be provided with a tapered portion, in particular a reduced height, at least at some crossing points with the fold edges. The beads can also be more narrow at the crossing points than beyond the crossing points. In this way, it is possible that pointedly extending folds are erected at the fold edges and the beads are not compacted thereby or do not cause rounding of the fold edges or distortion of the filter medium. Also, the required forces for erecting the folds can be reduced in this way.

Expediently, the tapered portion can be designed as an embossed portion. Particularly when the fold edges are embossed into the filter medium after the beads have been applied on the filter medium, the beads can be embossed also in this way and exhibit therefore the desired tapered portions at the crossing points with the fold edges.

Advantageously, the beads can be interrupted at least at some crossing points with the fold edges. In this way, in case of application of the beads after embossment of the fold edges it can be ensured that the folds can be easily erected and also pointedly extending folds can be realized without the beads at the base of the folds being pressed against each other and thereby causing an undesirable rounding of the folds or distortion of the filter medium.

Conceivable is also a combination of tapered portions of beads at the crossing points with interruptions of beads at the crossing points.

In an advantageous embodiment, the beads can be arranged on the designated clean side of the filter medium. In this way, a drainage action by means of the beads by deflection of the filtered fluid can be realized. Moreover, for the same stabilizing action it is prevented that, by contouring of the filter medium upon application of beads on the raw side, a non-uniform dirt deposition on the surface of the filter medium occurs.

It is furthermore advantageous when the beads are formed by application of a hot melt. Such a process can be integrated conveniently into the conventional manufacturing process for manufacturing a filter bellows in which the filter medium is passing through an embossing device usually in the form of long webs. In accordance with this solution according to the invention, additional adhesive application stations can be provided which additionally apply the hot melt at the same speed so that the normal manufacturing process is not impaired. Also, interruptions in the applied beads can be conveniently provided in this way in that the adhesive application stations are appropriately controlled and provided with valves.

In one embodiment of the invention the filter element can be formed of a filter medium which is comprised of cellulose, meltblown fibers, micro or nano fibers, woven or knit fibers, of a nonwoven or a combination of these materials.

In an advantageous embodiment, the filter bellows of the filter element can be configured as a hollow cylindrical round element with a star-shaped folded filter medium. For this purpose, the originally flat filter bellows of a zigzag-shaped folded filter medium can be formed to a hollow cylinder which is closed along an end face edge, for example, adhesively connected. The fluid to be filtered can then flow via the outer surface of the hollow cylinder through the filter medium and can drain via the interior area of the hollow cylindrical round filter along the axis of the hollow cylinder.

According to another aspect, the invention concerns the use of the filter element as a round filter for filtering a fluid, particularly as a round filter of an internal combustion engine. Such round filters are used in the automotive field preferably as air, oil or fuel filters or the like and employed on the internal combustion engines as exchangeable filter elements with regular exchange intervals.

According to a further aspect, the invention concerns a method for producing a filter element according to the invention that comprises the following manufacturing steps of a filter bellows: unwinding the filter medium from a roll, in particular storing the filter medium in a material store, applying beads onto the filter medium prior to or after embossment for forming fold edges, in particular pressing on the beads, erecting the fold edges to a zigzag-folded filter bellows. Such a process can be integrated conveniently into the usual manufacturing process for producing a filter bellows in which the filter medium is usually passing in the form of long webs through an embossing device. Thus, additional adhesive application stations can be provided which additionally apply the hot melt at the same speed so that the regular manufacturing process is not impaired. Also, interruptions in the applied beads can be conveniently provided in this way in that the adhesive application stations are appropriately controlled and provided with valves.

Conveniently, the method for producing a filter element may comprise further manufacturing steps of a filter bellows such as heating of the filter medium as a preparation for embossing, embossing fold edges into the filter medium. Embossing fold edges into the filter medium can be configured beneficially by prior heating of the filter medium because the embossed fold edges can be maintained permanently in this way.

Advantageously, the application of the beads can be carried out prior to the embossment of the fold edges. When the beads are applied prior to embossment, they can be provided during the embossment process with the desired tapering portions at the crossing points with the fold edges in order to promote the erection of the fold edges in particular to pointed folds.

Alternatively, the application of the beads can also be carried out after the embossment of the fold edges. In this context, tapering portions can be realized by interruptions of the beads, for example, by interrupting the application of hot melt beads at the fold edges.

After having been applied on the filter medium, the beads can be advantageously pressed onto the filter medium in order to achieve good and permanent adhesion. This can be done, for example, by a rolling process.

According to a further aspect, the invention concerns an apparatus for manufacturing a filter element which comprises at least the following devices for producing a filter bellows: an unwinding device, in particular a material store, a polymer application station for applying the beads, in particular a pressing roller, a feed heating device, an embossing device, as well as a fold erecting device. Instead of the polymer application station also a hot melt application station can be provided when a hot melt bead is employed as a bead.

BRIEF DESCRIPTION OF THE DRAWINGS

Further advantages result from the following drawing description. In the drawings embodiments of the invention are illustrated. The drawings, the description, and the claims contain numerous features in combination. A person of skill in the art will consider the features expediently also individually and combine them to other meaningful combinations.

DESCRIPTION OF PREFERRED EMBODIMENTS

In the Figures, same or similar components are identified with same reference characters. The Figures show only examples and are not to be understood as limiting.

Figure 1:
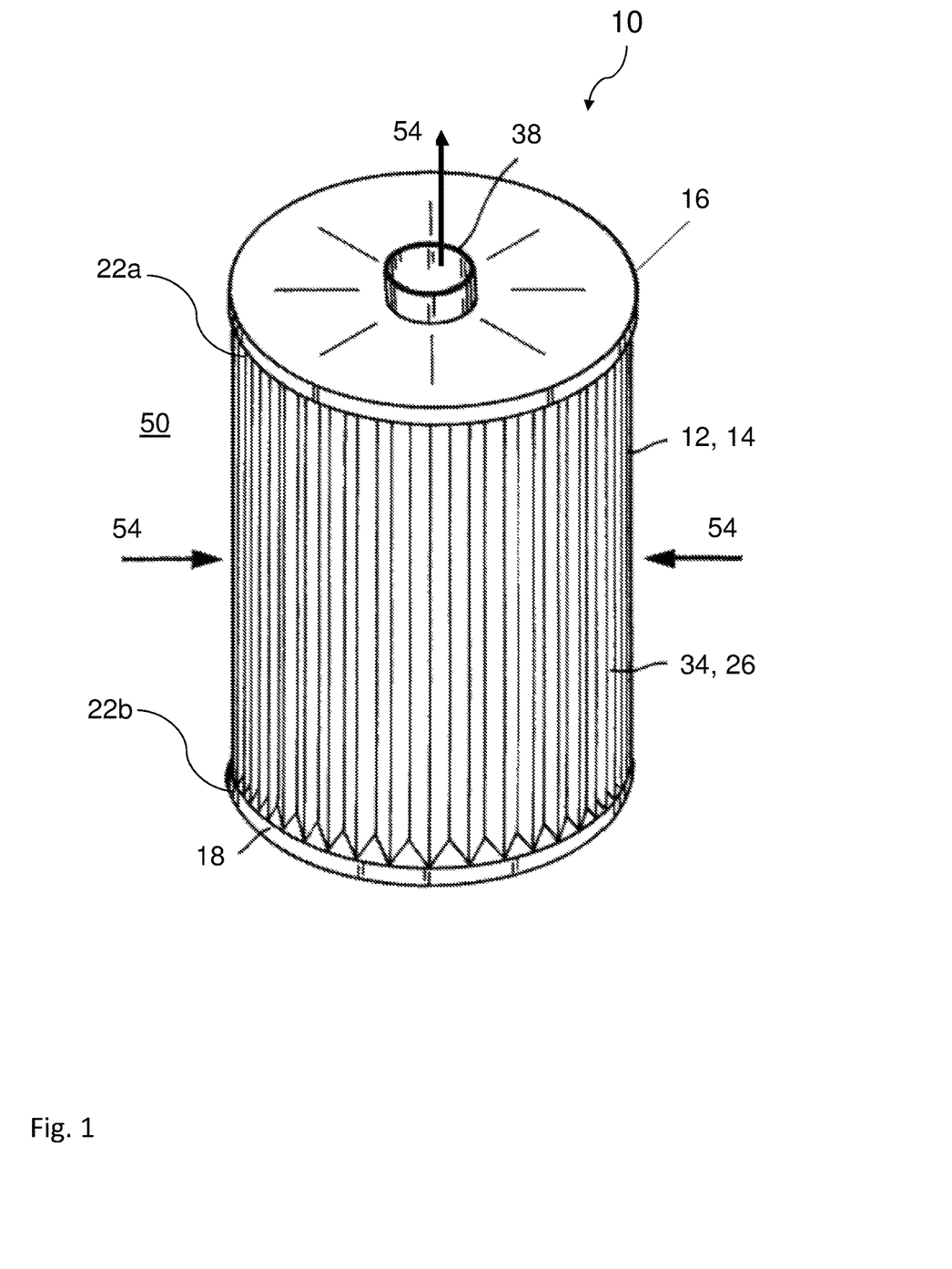
FIG. 1 shows an isometric illustration of a filter element according to an embodiment of the invention.

FIG. 1 shows an isometric illustration of a filter element 10 according to an embodiment of the invention. The filter element 10 for filtering a fluid comprises a filter bellows 12 of a filter medium 14 which is folded along fold edges 26 in a zigzag shape to folds 34 which extend between opposite end face edges 22a, 22b of the filter bellows 12, respectively. The filter medium 14 is designed for flow of the fluid from a raw side 50 of the filter element to a clean side 52 and particularly in a flow direction 54 from an exterior surface to an inner area of the filter element 10. On several of its flow-through faces, the filter medium 14 comprises several beads 42 on the clean side 52 (shown in FIGS. 2 and 3) which extend transverse to the fold edges 26 of the filter medium 14 and which, in the proper operating state of the filter bellows 12, effect flow of at least a portion of the fluid in a direction perpendicular to the fold edges 26 of the folds 34 of the filter bellows 12. Alternatively, the beads 42, or at least some of the beads 42, can also be extending in a wavy configuration and/or zigzag shape (indicated in FIG. 3). The filter element 10 in FIG. 1 is formed as a hollow cylindrical round filter element with a star-shaped folded filter medium 14. Such round filter elements are used in the automotive field preferably as air, oil, or fuel filters or the like and are employed on the internal combustion engines as exchangeable filter elements 10 with regular exchange intervals. The filter bellows 12 is closed at both end faces with terminal discs 16, 18 which comprise a central tube 38 through which the filtered fluid can flow out in flow direction 54.

Figure 2:
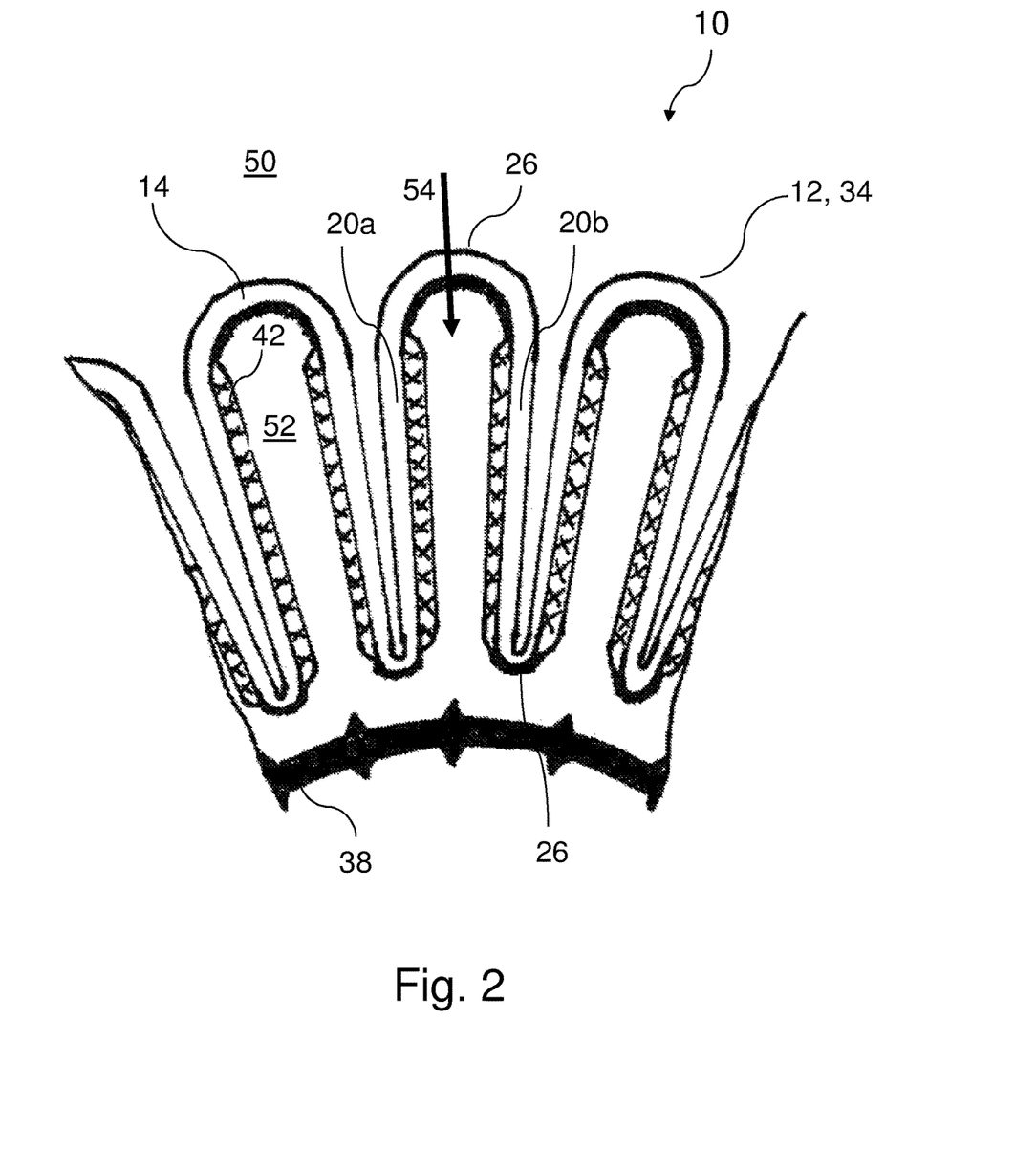
FIG. 2 shows a partial cross-section of a filter element according to an embodiment of the invention.

In FIG. 2 a partial section view of a filter element 10 according to an embodiment of the invention, as shown in FIG. 1, is illustrated. The cross-section shows several folds 34 of the filter bellows 12 which are folded to a round shape at fold edges 26. The fluid to be filtered passes from the raw side 50 outside of the round filter 10 into an inner area of the filter element 10 with the clean side 52. The filter bellows 12 is reinforced in the inner area with a central tube 38 that is partially illustrated in section. The filter medium 14 has beads 42 at the clean side 52. In addition to the drainage action for discharging the filtered fluid, the beads 42 cause the oppositely positioned unfolded filter medium section (at 20a, 20b), also referred to as fold edge surfaces 20a, 20b, of a fold 34 of the filter bellows 12 in the folded state of the filter medium 14 to be spaced apart at least in the operating state. The beads 42 are arranged in particular on the fold edge surfaces 20a, 20b and not in the curvature area of the folds 34.

Figure 3:
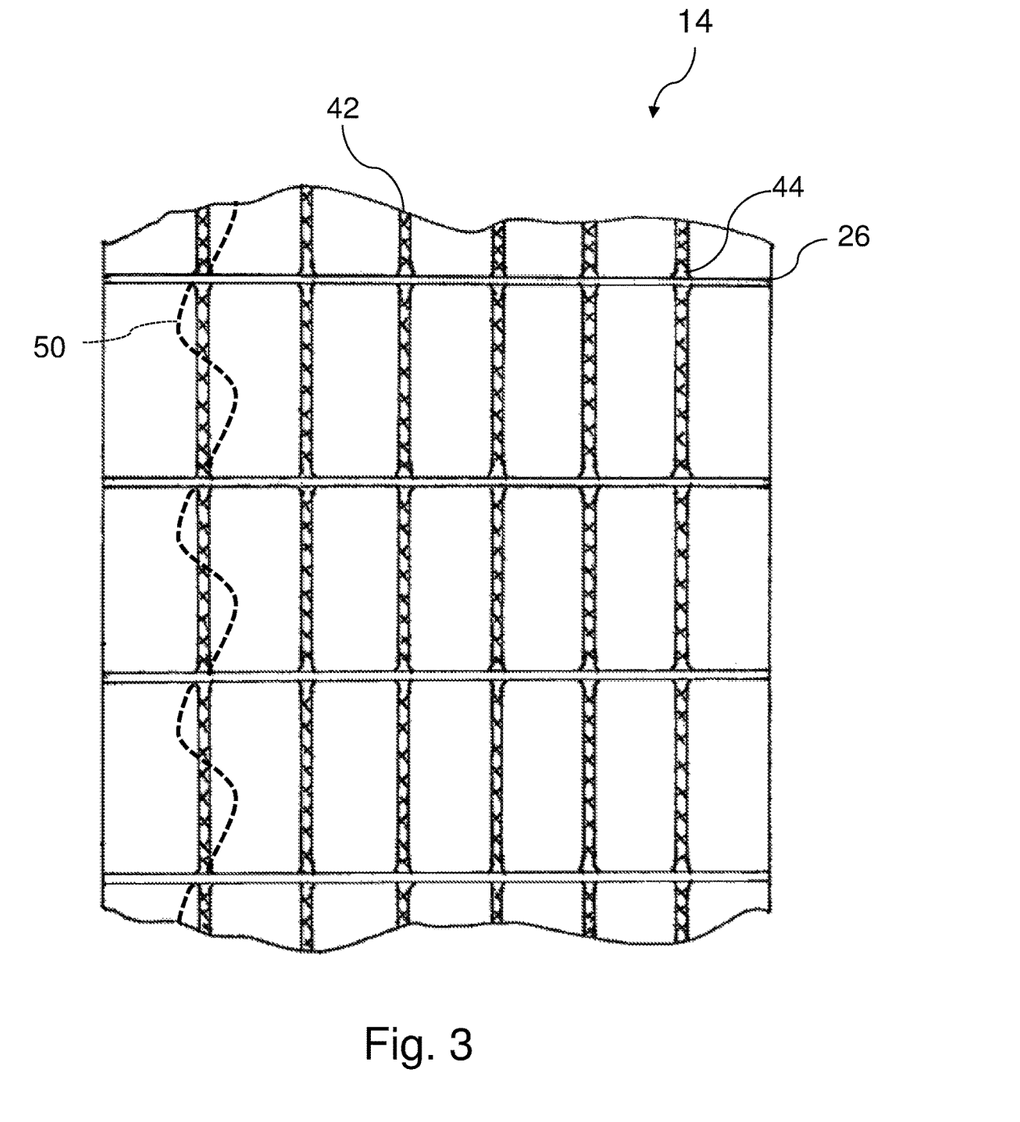
FIG. 3 is a plan view of a filter medium according to an embodiment of the invention.

FIG. 3 shows a plan view of a filter medium 14 according to an embodiment of the invention. The flat filter medium 14 has regularly spaced fold edges 26 which can be formed by embossing the filter medium 14. Beads 42 are extending transverse thereto. The beads 42 can be formed, for example, by application of a hot melt. At crossing points with the fold edges 26, the beads 42 have tapered portions 44, in particular a reduced height. The tapered portions 44 can also be embodied as embossments of the fold edges 26 inasmuch as the beads 42 are applied prior to embossment of the filter medium 14. Alternatively, the beads 42 can be interrupted at crossing points with the fold edges 26. This can be affected in that the hot melt application is interrupted when being applied at the crossing points, respectively.

In an alternative variant, the beads 42 can also be extending in a wavy shape and/or zigzag shape. In FIG. 3 a bead 50 with such a course is indicated as an example. Such a course of the beads 42 is advantageous in that the bead sections will contact each other reliably at oppositely positioned fold edge surface sections 20a, 20b in the folded filter medium 14.

Figure 4:
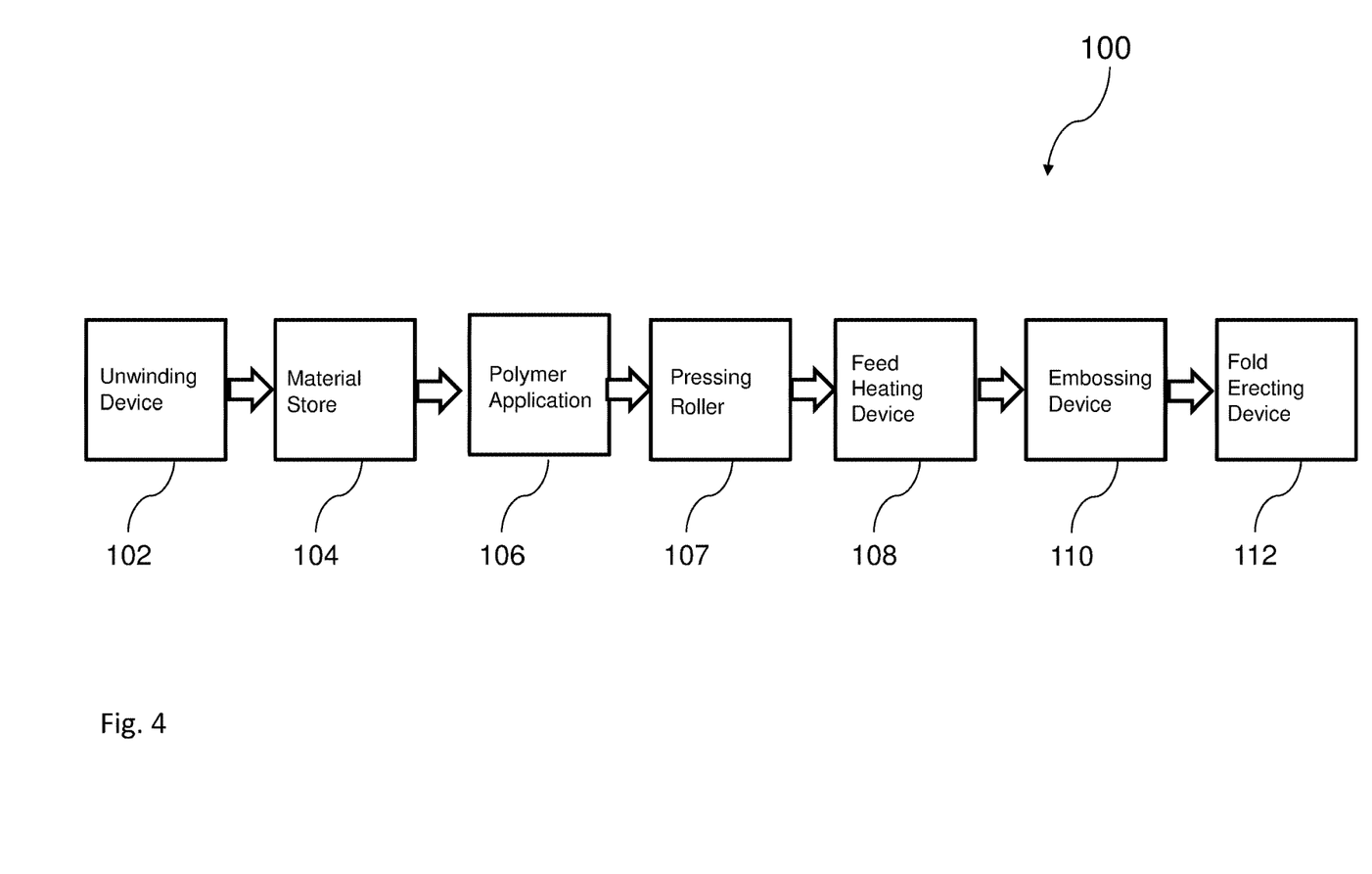
FIG. 4 is a schematic illustration of an apparatus for manufacturing a filter element according to an embodiment of the invention.

In FIG. 4, a schematic illustration of an apparatus 100 for manufacturing a filter element 10 according to an embodiment of the invention is shown. The method for manufacturing a filter element 10 according to the invention comprises the following manufacturing steps of the filter bellows 12: unwinding the filter medium 14 from a roll, storing the filter medium 14 in a material store 104, applying beads 42 onto the filter medium 14 prior to or after embossment for forming fold edges 34, pressing on the beads 42, erecting the fold edges 34 to a zigzag-shaped folded filter bellows 12. Such a process can be integrated conveniently into the usual manufacturing sequence for manufacturing a filter bellows 12 in which the filter medium 14 is usually passing through an embossing device 110 in the form of long webs. Accordingly, additional adhesive application stations 106 can be provided that additionally apply the hot melt at the same speed so that the normal manufacturing process is not impaired. Interruptions of the applied beads 42 can thus be provided also conveniently in that the adhesive application stations 106 are appropriately controlled and provided with valves.

The application of the beads 42 can be provided prior to or after an embossment process. When the beads 42 are applied prior to embossment, they can be provided during the embossment process with desired tapered portions 44 at the crossing points with the fold edges 26 in order to promote erection of the fold edges 26 to folds 34, in particular to pointedly extending folds. Alternatively, the beads 42 can however also be applied after the embossment process. In this context, the tapered portions 44 can be realized by interruptions of the beads 42, for example, by application of hot melt beads with interruption at the fold edges 26.

The beads 42, after having been applied onto the filter medium 14, can advantageously be pressed onto the filter medium 14 in order to achieve a good and permanent adhesion. This can be conveniently effected by a rolling process, for example.

Expediently, the method for manufacturing a filter element 10 can comprises additional manufacturing steps of a filter bellows 12 such as heating the filter medium as a preparation for embossment, embossing fold edges 26 into the filter medium 14. Embossing fold edges 26 into the filter medium 14 can be beneficially realized by prior heating of the filter medium 14 because the embossed fold edges 26 are thus maintained permanently.

The apparatus 100 for manufacturing a filter medium 10 in FIG. 4 comprises the following devices for manufacturing a filter bellows 12: an unwinding device 102, a material store 104, a polymer application station 106 for applying the beads 42, a pressing roller 107 for pressing on the beads 42 onto the filter medium 14, a feed heating device 108, an embossing device 110, as well as a fold erecting device 112. Instead of the polymer application station 106, a hot melt application station can be provided also when a hot melt bead is to be employed as a bead 42.

While specific embodiments of the invention have been shown and described in detail to illustrate the inventive principles, it will be understood that the invention may be embodied otherwise without departing from such principles.

What is claimed is:

1. A filter element for filtering a fluid, the filter element comprising:
   a hollow round filter bellows comprising a filter medium folded along sharp or rounded fold edges in a zigzag shape to form a plurality of folds, each fold having a respective sharp or rounded fold edge arranged between and connecting an unfolded filter medium section to an adjacent unfolded filter medium section;
   wherein the folds extend between oppositely positioned end face edges, the end face edges positioned at opposite axial ends of the filter bellows;
   wherein the filter bellows defines a raw side and a clean side of the filter element, wherein a fluid to be filtered flows from the raw side to the clean side;
   wherein the filter medium comprises faces that are flowed through by the fluid to be filtered and
   wherein the filter medium further comprises on at least one of the faces that are flowed through one or more beads extending transversely to the fold edges of the filter medium;
   wherein individual ones of the one or more beads are arranged entirely on a single respective unfolded filter medium section of a fold, and are interrupted at the sharp or rounded fold edge so as to not extend across the sharp or rounded fold edge and onto the adjacent unfolded filter medium section, wherein the one or more beads are each spaced apart from each other and spaced apart from adjacent unfolded filter medium sections;
   wherein, in a proper operating state of the filter bellows, the beads effect a flow of at least a portion of the fluid to be filtered in a direction perpendicular to the fold edges.

2. The filter element according to claim 1, wherein,
   the unfolded filter medium sections of the fold are oppositely positioned;
   wherein the one or more beads cause the unfolded filter medium sections of the fold to be spaced apart, respectively, at least in the operating state of the filter element.

3. The filter element according to claim 1, wherein the beads are arranged on a designated clean side of the filter medium forming the clean side of the filter element.

4. The filter element according to claim 1, wherein the beads are hot melt beads applied onto the filter medium.

5. The filter element according to claim 1, wherein the filter bellows is of a hollow cylindrical form and the filter medium is folded in a star shape.

6. The filter element according to claim 1 in the form of a round filter element for filtering a fluid.

7. The filter element according to claim 1 in the form of a round filter element of an internal combustion engine.

* * * * *